(12) United States Patent
Maurer et al.

(10) Patent No.: US 12,043,558 B2
(45) Date of Patent: Jul. 23, 2024

(54) DEVICE AND METHOD FOR THE ELECTRODEIONIZATION OF A LIQUID

(71) Applicant: SWAN ANALYTISCHE INSTRUMENTE AG, Hinwil (CH)

(72) Inventors: Heinrich Maurer, Rapperswil-Jona (CH); Achilles Pfleghart, Hinwil (CH); Julia Gath, Zurich (CH)

(73) Assignee: Swan Analytishce Instrumente AG, Hinwil (CH)

( * ) Notice: Subject to any disclaimer, the term of this patent is extended or adjusted under 35 U.S.C. 154(b) by 1171 days.

(21) Appl. No.: 16/326,636

(22) PCT Filed: Aug. 23, 2016

(86) PCT No.: PCT/EP2016/069886
§ 371 (c)(1),
(2) Date: Feb. 19, 2019

(87) PCT Pub. No.: WO2018/036612
PCT Pub. Date: Mar. 1, 2018

(65) Prior Publication Data
US 2021/0276893 A1    Sep. 9, 2021

(51) Int. Cl.
*C02F 1/469*    (2023.01)
*B01D 61/48*    (2006.01)
(Continued)

(52) U.S. Cl.
CPC ............ *C02F 1/4695* (2013.01); *B01D 61/48* (2013.01); *B01D 61/50* (2013.01); *B01D 61/54* (2013.01);
(Continued)

(58) Field of Classification Search
CPC .............................. C02F 1/4695; B01D 61/48
See application file for complete search history.

(56) References Cited

U.S. PATENT DOCUMENTS

| | | | |
|---|---|---|---|
| 2,611,007 A | 9/1952 | Cade et al. | |
| 2,761,833 A * | 9/1956 | Ward | C02F 1/003 |
| | | | 222/215 |

(Continued)

FOREIGN PATENT DOCUMENTS

| | | |
|---|---|---|
| EP | 0777120 A2 | 6/1997 |
| EP | 1038837 A2 | 9/2000 |

(Continued)

OTHER PUBLICATIONS

English Translation of JP 2004/050017 (Year: 2004).*

(Continued)

*Primary Examiner* — Salil Jain
(74) *Attorney, Agent, or Firm* — Notaro, Michalos & Zaccaria P.C.

(57) ABSTRACT

A device for the electrodeionization of a sample liquid. The device has an anode chamber having two openings and an anode, a cathode chamber having two openings and a cathode, and a treatment chamber, that is arranged between the anode chamber and the cathode chamber and has two openings and ion exchanger. The anode chamber and the cathode chamber are separated from the treatment chamber in each case by a permselective membrane and an energy source is operatively connected to the anode and the cathode. In addition, a method for the electrodeionization of a sample liquid is provided.

31 Claims, 4 Drawing Sheets

(51) Int. Cl.
- B01D 61/50 (2006.01)
- B01D 61/54 (2006.01)
- C02F 1/00 (2023.01)
- C02F 1/20 (2023.01)
- G01N 27/06 (2006.01)
- *C02F 103/02* (2006.01)
- *G01M 3/16* (2006.01)

(52) U.S. Cl.
CPC .............. C02F 1/001 (2013.01); C02F 1/008 (2013.01); C02F 1/20 (2013.01); G01N 27/06 (2013.01); *B01D 2311/2649* (2013.01); *B01D 2311/2653* (2013.01); *B01D 2313/365* (2013.01); *C02F 2103/023* (2013.01); *C02F 2201/46135* (2013.01); *C02F 2201/4614* (2013.01); *C02F 2209/02* (2013.01); *C02F 2209/05* (2013.01); *C02F 2209/40* (2013.01); *G01M 3/16* (2013.01)

(56) References Cited

U.S. PATENT DOCUMENTS

| | | | |
|---|---|---|---|
| 4,324,606 A | 4/1982 | Withers | |
| 4,997,567 A | 3/1991 | Messalem et al. | |
| 2002/0092769 A1* | 7/2002 | Garcia | |
| 2003/0094406 A1* | 5/2003 | Smith | B01D 65/022 |
| | | | 210/96.2 |
| 2003/0180186 A1* | 9/2003 | Carson | G01N 27/06 |
| | | | 422/82.01 |
| 2005/0103692 A1* | 5/2005 | Jha | |
| 2005/0263457 A1* | 12/2005 | Wilkins | |
| 2014/0251824 A1* | 9/2014 | Astle | C02F 1/4695 |
| | | | 204/229.4 |

FOREIGN PATENT DOCUMENTS

| | | |
|---|---|---|
| EP | 1044717 A2 | 10/2000 |
| EP | 1167954 A1 | 1/2002 |
| EP | 1466656 A2 | 10/2004 |
| EP | 1598318 A1 | 11/2005 |
| JP | S52151678 A | 12/1977 |
| JP | S53034355 A | 3/1978 |
| JP | S59188248 U | 12/1984 |
| JP | H109210943 A | 8/1997 |
| JP | H10500617 A | 1/1998 |
| JP | 2001124717 A | 5/2001 |
| JP | 2001239270 A | 9/2001 |
| JP | 2003326267 A | 11/2003 |
| JP | 2004034004 A | 2/2004 |
| JP | 2004050017 A * | 2/2004 |
| JP | 2004050017 A | 2/2004 |
| JP | 2004506895 A | 3/2004 |
| JP | 2009226315 A | 10/2009 |
| JP | 2011125823 A | 6/2011 |
| JP | 2012170906 A | 9/2012 |
| JP | 2015073944 A | 4/2015 |
| RU | 2009128193 A | 1/2011 |
| RU | 2458865 C2 | 8/2012 |
| WO | 057165 A1 | 9/2000 |
| WO | 02/14850 A1 | 2/2002 |

OTHER PUBLICATIONS

English Translation of CN-1938587 (Year: 2007).*
International Preliminary Report on Patentability for corresponding PCT application No. PCT/EP2016/069886, issued Feb. 26, 2019.
International Search Report for corresponding PCT application No. PCT/EP2016/069886, mailed May 15, 2017.
Search Report for corresponding Japanese application No. 2019-5100944, dated Apr. 22, 2020.

* cited by examiner

DEVICE AND METHOD FOR THE ELECTRODEIONIZATION OF A LIQUID

This invention relates to a device and a method for the electrodeionization of a liquid.

Electrodeionization is a combination of ion exchange and electrodialysis and serves to remove ions and ionizable substances from a liquid, especially water. The aim is most often to generate salt-free water, also known as deionized or demineralized (DM) water. Another area of application is the monitoring of process water circuits in power plants such as thermal power plants. A specific conductivity measurement of the process water is carried out to check whether liquid could penetrate from the cooling water circuit fed with seawater or surface water via a leak into the process water circuit. Since ammonia and/or amines are added to the process water to prevent corrosion of the pipes, among other things, the process water already inherently has a specific conductivity, which would not change significantly if saline cooling water, in particular sodium chloride (NaCl), dissolved in the cooling water, were to penetrate. However, if the conductivity measurement takes place after a cation exchange, the amount of cations from the additives contributing to the inherent conductivity is reduced and hydrochloric acid (HCl) is present instead of sodium chloride (NaCl). Since the specific conductivity of an identical number of HCl molecules is significantly higher than the specific conductivity of an identical number of NaCl molecules, the penetration of cooling water into the process water circuit can be determined by the increase in the specific conductivity of the process water after a cation exchanger. A device and method for detecting negative ions in water for the purpose of detecting the penetration of cooling water into the process water are described in EP1167954B1, for example.

The objective of this invention is to provide an improved device and method for electrodeionization of a liquid.

This problem is solved by a device for the electrodeionization of a sample liquid. The device comprises an anode chamber comprising two openings and an anode, a cathode chamber comprising two openings and a cathode and a treatment chamber located between the anode chamber and the cathode chamber comprising two openings and ion exchangers. In said device, the anode chamber and the cathode chamber are separated from the treatment chamber by a permselective membrane and an energy source is operatively connected to the anode and the cathode.

There are two alternative connection possibilities between the chambers. On the one hand, one of the openings of the treatment chamber, the openings of the anode chamber and one of the openings of the cathode chamber may be connected to each other so that the treatment chamber is operatively connected to the anode chamber and the anode chamber is operatively connected to the cathode chamber. On the other hand, one of the openings of the treatment chamber, one of the openings of the anode chamber and the openings of the cathode chamber may be interconnected such that the treatment chamber is operatively connected to the cathode chamber and the cathode chamber is operatively connected to the anode chamber.

The energy source is, for example, is a voltage source, in particular a DC voltage source, which enables the uncomplicated application of a DC voltage between the electrodes, i.e. the anode and the cathode. The anode is then connected to the positive pole and the cathode to the negative pole of the DC voltage source. The electrodes can inter alia be metal wires, metal mesh or metal plates, which can also be made of expanded metal.

The openings of a chamber may be arranged spaced apart from each other, in particular one of the openings may be in the upper third of the chamber and the other in the lower third of the chamber. It is also possible that one opening is located on the upper side of the chamber and the other opening is located on the underside of the chamber.

The permselective membrane is a physical interface that is partially or semi-permeable, i.e. it retains certain substances/matter and allows other substances/matter to pass through. For example, it can be an anion-permeable or a cation-permeable membrane. Such a membrane is substantially impermeable to e.g. water, gas and electrons, but allows anions or cations to pass through. The counterion in turn is held back and cannot penetrate the membrane. Such a permselective membrane can be constructed, for example, from a sulfonated tetrafluoroethylene polymer. Further examples of suitable permselective membranes are described in the patent specifications U.S. Pat. Nos. 4,324,606 and 4,997,567. The chambers can be three spatially separable units, which, for example, can be connected via a quick-release system instead of the usual threaded tie rods to form a compact unit comprising all three chambers. For example, the chambers have a cuboid basic structure, wherein two edge lengths, such as height and width, of all chambers are identical, but the depth can vary. The later central treatment chamber can comprise six side surfaces, of which two opposite side surfaces are substantially formed by one permselective membrane each. However, the anode chamber and the cathode chamber have only five substantially flat side surfaces and can be connected to the treatment chamber in such a way that one permselective membrane each serves as the sixth side surface. However, it can also be a structure, which is comparable to a partially covered tub. On two opposite sides, such a tub comprises an anode on one side and a cathode on the other. By inserting a treatment chamber between the anode and cathode in the uncovered part of the tub, a device comprising three-chambers can also be formed. This inserted treatment chamber is filled with ion exchangers and comprises two opposite side surfaces, which are substantially formed by a permselective membrane each. The area of the permselective membranes is large enough to divide the tank into three separate chambers, liquid-tight and gas-tight, in the direction of the treatment chamber. The hydraulic operative connection of the chambers can be achieved, for example, by conduits. An opening in the treatment chamber can be connected to an opening in the anode chamber via a hose. The other opening of the anode chamber is connected to one of the openings of the cathode chamber again by a hose. The opening of the treatment chamber that is not connected to the anode chamber, can serve as an inlet opening for the sample liquid. The opening of the cathode chamber that is not connected to the anode chamber, can serve as an outlet for the sample liquid.

In one embodiment of the device according to the invention, which may be combined with any of the embodiments to be named, unless contradictory thereto, the one opening of the treatment chamber, the openings of the anode chamber and the one opening of the cathode chamber are interconnected so that the supplied sample liquid in the treatment chamber is guided substantially in the direction of gravity and is guided in the anode chamber and the cathode chamber substantially opposite the direction of gravity.

Such a flow of sample liquid can be achieved, for example, by supplying the sample liquid to the treatment chamber via an opening arranged on the upper side of the treatment chamber, then flowing through the treatment chamber substantially along its length and the sample liquid exiting the treatment chamber via an opening arranged on the lower side of the treatment chamber. The sample liquid is then introduced by means of a conduit through an opening in the underside of the anode chamber, flows through it substantially along its length, flows at least partially between the anode and the permselective membrane facing the anode and exits the anode chamber at the top of the anode chamber through an opening arranged on the top. By means of a conduit, the sample liquid is then introduced into the cathode chamber via an opening in the underside of the cathode chamber, flows through it substantially along its length, flows at least partially between the cathode and the permselective membrane facing the cathode and exits at the top of the cathode chamber via an opening arranged there.

Lengthwise means substantially from top to bottom and vice versa. With regard to the permselective membranes, there is no flow of the sample liquid transversely in the chambers, but only lengthwise to the membranes.

In an embodiment of the device according to the invention, which can be combined with any of the already mentioned embodiments and with any of the embodiments still to be named, unless contradictory thereto, a conductivity sensor is placed in front of the unconnected openings of the treatment chamber.

A conductivity sensor placed in front of the opening of the treatment chamber that is not connected to one of the openings of the anode chamber, can be used to determine the conductivity of the sample liquid before entering the treatment chamber. For example, the water for steam production is in general alkalized because the protective layers of iron oxide on the inner surfaces of the water-steam circuit are less soluble at high pH values and therefore remain fixed in place. This protects the underlying metal from further attacks by hot water and steam. Since the parameters conductivity, pH and concentration of the alkalizing agent are related, measuring the conductivity of ultrapure water with an alkalizing agent allows calculating the concentration of the alkalizing agent and the pH of the solution of ultrapure water and the alkalizing agent. Typical process water conductivities for steam generation range from 8 microsiemens/cm to 45 microsiemens/cm. A typical sensor for measuring the electrical conductivity of liquids is described in U.S. Pat. No. 2,611,007 "Temperature Compensating Conductivity Cell". Another example of a modern conductivity sensor is the "Swansensor UP-Con 1000" from SWAN Analytical Instruments.

In an embodiment of the device according to the invention, which can be combined with any of the already mentioned embodiments and with any of the embodiments still to be named, unless contradictory thereto, a conductivity sensor is arranged between the treatment chamber and the anode chamber.

A conductivity sensor arranged between the treatment chamber and the anode chamber, for example, in a conduit connecting said chambers, can be used to determine the conductivity of the sample liquid after passing through the treatment chamber.

Since the treatment chamber is at least partially filled with ion exchange resin, an ion exchange takes place when passing through the treatment chamber, which has an influence on the conductivity of the sample liquid depending on the type and quantity of ions dissolved in the sample liquid.

Due to the separation of the ion exchanger from the anode and the cathode by the permselective membranes, no gases produced by electrolysis at the anode and cathode can penetrate into the treatment chamber and be transported with the sample liquid to the conductivity sensor. In this way, an uncompromised measurement of conductivity can be achieved. Since the conductivity measurement takes place before the sample liquid passes the electrodes, oxidation or reduction of the ions in the sample liquid can only take place after the conductivity measurement.

If the conductivity of the sample liquid is determined before and after the treatment chamber, this offers extended analytical possibilities. For example, it is possible to determine the pH value of the sample liquid.

In an embodiment of the device according to the invention, which can be combined with any of the already mentioned embodiments and with any of the embodiments still to be named, unless contradictory thereto, a degassing unit is arranged downstream of the conductivity sensor located between the treatment chamber and the anode chamber. Another conductivity sensor is arranged between the degassing unit and the anode chamber.

Gases, which are present in the sample liquid and are fed to the treatment chamber, can occur as gas bubbles, i.e. in undissolved or dissolved form. Gas bubbles interfere with the conductivity measurement itself and cause erratic signals. Dissolved gases, which dissociate, i.e. at least partially decompose into charged particles (ions), increase the specific conductivity of the sample liquid. For example, carbon dioxide ($CO_2$) dissolved in water can form carbonate or bicarbonate ions and protons depending on the pH value. The $CO_2$ can be expelled from the sample liquid by boiling or other physical methods. The conductivity measurement of the sample liquid after this degassing, for example, enables the $CO_2$ content to be determined.

If only one part of the sample liquid is fed through the degassing unit and the other part is fed directly into the anode chamber, the sample liquid fed through the degassing unit can be fed back in series or in parallel, i.e. the two parts of the sample liquid can be brought together and only then fed into the anode chamber, or the two parts can be fed in parallel through separate openings in the anode chamber. It is also possible for the entire sample flow after the treatment chamber to pass first through a conductivity sensor, then through a degassing unit and then through another conductivity sensor on its way into the anode chamber. It is also possible to reject a partial flow.

In one embodiment of the device according to the invention, which can be combined with any of the already mentioned embodiments and with any of the embodiments still to be named, unless contradictory thereto, at least one of the conductivity sensors comprises a temperature sensor.

If a temperature sensor is integrated into the conductivity sensor, the temperature-compensated specific conductivity of the sample liquid can be determined.

In an embodiment of the device according to the invention, which can be combined with any of the already mentioned embodiments and with any of the embodiments still to be named, unless contradictory thereto, the device comprises at least one flow sensor. This at least one flow sensor can, for example, be located at one of the openings of the treatment chamber, one of the openings of the anode chamber and/or one of the openings of the cathode chamber.

Flow sensors enable continuous flow measurement and can provide verification of the conductivity measurement. If there is a flow rate, the measured specific conductivity is actually measured online and reflects the current value.

Typical flow rates range from 2 liters per hour to 15 liters per hour, for example.

In an embodiment of the device according to the invention, which can be combined with any of the already mentioned embodiments and with any of the embodiments still to be named, unless contradictory thereto, the ion exchanger is a cation exchange resin.

A suitable strongly acidic gel-like ion exchange resin is, for example, the Amberjet-1000-H-L (reg) from Rohm and Haas.

In an embodiment of the device according to the invention, which can be combined with any of the already mentioned embodiments and with any of the embodiments still to be named, unless contradictory thereto, the ion exchanger is a color-indicating ion exchanger, in particular a color-indicating cation exchange resin.

For example, a strongly acidic cation exchange resin can be used, which is colored with an acid/base color indicator. If the resin is "used up", i.e. loaded with cations, such as for example basic ammonium ions ($NH_4^+$), which have been exchanged for acid protons ($H^+$), the pH value increases and the cation exchange resin or indicator shows this by a reversible color change. When the resin is regenerated, the original color reappears. Deviations from the color distribution typical for the system can be an indication of a dysfunction, for example.

An example of a suitable cation exchange resin with indicator is the type Lewatit S 100 G1 (reg) from Lanxess.

In an embodiment of the device according to the invention, which can be combined with any of the already mentioned embodiments and with any of the embodiments still to be named, unless contradictory thereto, the treatment chamber is at least partially transparent, in particular along the openings of the treatment chamber.

If it is possible to look inside the treatment chamber, impurities that have penetrated the treatment chamber, for example, can be perceived. Iron oxide deposits can also be detected on the ion exchanger. If a color-indicating ion exchanger is located in the treatment chamber, its condition can be checked and, if necessary, the used ion exchanger can be replaced, the entire treatment chamber can be replaced or other suitable measures can be taken, for example.

In an embodiment of the device according to the invention, which can be combined with any of the already mentioned embodiments and with any of the embodiments still to be named, unless contradictory thereto, the device comprises an optical sensor. The optical sensor can be used to monitor the ion exchanger.

Instead of being checked by the human eye, an optical sensor, which can, for example, perform spectrally selective reflection measurements, can also be mounted in such a way that it can monitor the color and thus the quality of a color-indicating ion exchanger located in the treatment chamber. If, for example, a certain critical value is exceeded, an electronic measuring system connected to the optical sensor can trigger an alarm or an electronic control unit can interrupt the electrodeionization process and/or the sample flow, since a faultless functioning of the device can no longer be guaranteed. An electronic control system, which triggers an automatic exchange of the used ion exchanger, is also conceivable.

In an embodiment of the device according to the invention, which can be combined with any of the already mentioned embodiments and with any of the embodiments still to be named, unless contradictory thereto, the device comprises an electronic measuring system. The electronic measuring system records and processes at least one signal from at least one of the conductivity sensors, at least one signal from at least one of the temperature sensors, at least one signal from at least one of the flow sensors, at least one signal from at least the optical sensor, a voltage of the energy source and/or a current of the energy source.

Such an electronic measuring system enables the recording and/or evaluation of all sensors comprised in the device. The same applies to the parameters voltage and current of the energy source. The electronic measuring system can be integrated into a panel, which allows the measured values to be read and which comprises an interface to an external computer or data carrier. For example, the electronic measuring system can trigger an alarm as soon as a conductivity sensor transmits a critical specific conductivity of the sample liquid before or after cation exchange or after degassing. The electronic measuring system can be coupled with an electronic control system, which controls the device according to the signals supplied via the electronic measuring system. For example, with an increased flow rate or an increased input conductivity, the voltage between anode and cathode can be increased to generate more protons at the anode, which in turn migrate through the permselective membrane into the treatment chamber, where they ensure the increased need for protons to regenerate the more heavily loaded ion exchanger.

The electrodeionization device can be powered from a common energy source, which can be integrated into the electronic measuring system.

In an embodiment of the device according to the invention, which can be combined with any of the already mentioned embodiments and with any of the embodiments still to be named, unless contradictory thereto, at least one of the openings of the treatment chamber comprises a filter unit.

A filter unit arranged in front of the opening of the treatment chamber, which serves as an inlet for the sample liquid, prevents or reduces the penetration of impurities into the treatment chamber. It also prevents the ion exchange resin from being washed out during unusual operating conditions of the power plant, such as when the steam generator is being driven up and down. Without a filter unit, water and thus ion exchange resin could also be sucked back through the inlet opening of the device. A filter unit in front of the opening of the treatment chamber, which is operatively connected to an opening of the anode chamber, prevents the washing out of ion exchangers from the treatment chamber with the sample liquid. The filter unit may be, for example, filter plates made of sintered polyethylene, in particular ultra-high molecular weight sintered polyethylene. The pore size of the filter unit can, for example, be between 5% and 50% of the minimum diameter of the ion exchanger in order to reliably retain the ion exchanger.

Typical monodisperse ion exchange resins, for example, have a ball diameter of 0.65 mm with a range of dispersion of +/−0.05 mm.

Figure 3:
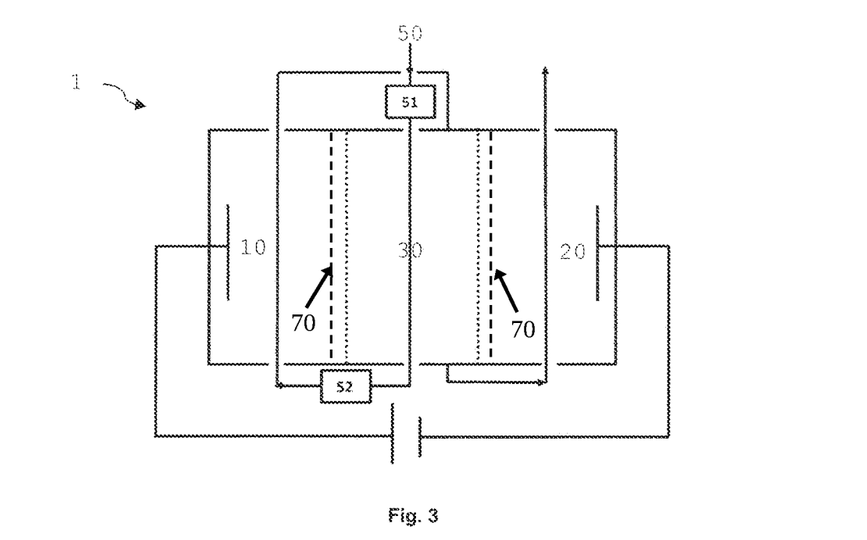
FIG. 3 shows a schematic representation of an embodiment according to FIG. 2 of a device according to the invention with two conductivity sensors.

In an embodiment of the device according to the invention, which can be combined with any of the already mentioned embodiments and with any of the embodiments still to be named, unless contradictory thereto, the device comprises at least one ion-conducting membrane 70 as shown in FIG. 3. This may be another permselective membrane, for example, if the ion conducting membrane is comparable or identical to the permselective membranes separating the anode chamber and cathode chamber from the treatment chamber. This can be arranged in the anode chamber between the anode and the permselective membrane facing it or in the cathode chamber between the cathode and the permselective membrane facing it. An ion-conducting membrane can also be arranged in the anode chamber and in the cathode chamber.

Such an ion-conducting membrane protects the permselective membrane from aggressive substances produced at the electrodes, such as nascent oxygen or ozone. The ion-conducting membrane also protects the permselective membrane from being damaged by sharp edges, as can occur with electrodes made of expanded metal or metal screens.

In an embodiment of the device according to the invention, which can be combined with any of the already mentioned embodiments and with any of the embodiments still to be named, unless contradictory thereto, the treatment chamber of the device is interchangeable.

For use in the device according to the invention for electrodeionization of a sample liquid, a treatment chamber is provided, which has a substantially cuboid basic structure. The treatment chamber comprises two openings spaced apart from each other and two opposite side surfaces, which are substantially each formed by a permselective membrane.

The openings may be spaced apart, e.g. an opening may be located in the upper part of the treatment chamber and an opening in the lower part of the treatment chamber. Upper or top part and lower or bottom part of a chamber means, unless otherwise defined, the lower third and upper third of the chamber. Also, one of the openings may be located on the upper side and one on the underside of the treatment chamber. The surfaces of the cuboid basic structure not formed by the permselective membranes are, for example, formed by plastic plates, in particular mechanically strong plastic plates.

In an embodiment of the treatment chamber according to the invention, which can be combined with any of the embodiments still to be named, unless contradictory thereto, the opposite side surfaces comprise a substantially rectangular frame each, which forms part of the basic structure and on which a permselective membrane is adhesively applied.

The cuboid basic structure can be composed of two frames aligned parallel to each other, which are connected water-tight and gas-tight with four plates completing the parallelepipedal basic structure.

For example, the frames and plates can be made of plastic. One permselective membrane, which completely covers the cavity enclosed by the frame, is attached to said frame in a gas-tight and water-tight manner, in particular by gluing or laminating. The frame can have a groove, for example, to accommodate excess adhesive. The groove can be circumferential and arranged in such a way that it is located outside the adhesive point but is still overlapped by the permselective membrane.

In an embodiment of the treatment chamber according to the invention, which can be combined with any of the already mentioned embodiments and with any of the embodiments still to be named, unless contradictory thereto, a further opening for filling ion exchangers and/or a further opening for degassing is provided adjacent to one of the openings. In particular, at least one of these additional openings can be closed water-tight and gas-tight.

The further opening(s) may be located in the upper third of the treatment chamber, in particular on the upper side of the treatment chamber, and may be (re-)closable and/or connectable in a water-tight and gas-tight manner.

In an embodiment of the treatment chamber according to the invention, which can be combined with any of the already mentioned embodiments and with any of the embodiments still to be named, unless contradictory thereto, at least one of the openings is covered by a filter unit. The filter unit can be arranged in the opening itself, directly on the opening, or resting on at least one support element.

The opening for inlet of the sample liquid and the opening for degassing can, for example, be covered by separate filter units or by a common filter unit. A filter unit can be located both in the opening itself and on top of the opening, both inside and outside the treatment chamber. An opening in the underside of the treatment chamber for discharging the sample liquid may be covered by a filter unit, which is located within the treatment chamber and has a surface substantially equal to the surface of the underside, for example. The treatment chamber can also be equipped with filters, e.g. round filters, which are substantially arranged plane-parallel to the permselective membranes within the treatment chamber.

If one wishes to avoid such a flat filter unit lying directly on the underside of the treatment chamber, the filter unit can rest on at least one support element and indirectly cover the opening. The indirect contact of the filter unit prevents a part of the filter surface from being blocked for the through-flow. For example, one or more perforated support rings, spiral-shaped bodies or radial channels can be used as support elements. Instead of filter plates made of sintered polyethylene, fine-meshed plastic nets made of polypropylene, polyethylene, polyester and/or a fluoropolymer may also be used as a filter unit, the mesh size of which is at least 50% smaller than the smallest diameter of the resin balls of the ion exchange resin used, wherein in particular the mesh size corresponds to 5% to 50% of the smallest diameter of the resin balls. Suitable fluoropolymers are, for example, PTFE, FEP and/or ECTFE. The nets can, for example, be adhesive or fastened with clamping elements. The nets can also rest on the support elements mentioned above.

In an embodiment of the treatment chamber according to the invention, which can be combined with any of the already mentioned embodiments and with any of the embodiments still to be named, unless contradictory thereto, the outer sides of the side surfaces that are each formed substantially by a permselective membrane are provided with detachably fixed protective elements, in particular with rigid plates.

To protect the treatment chamber for transport and storage, protective elements, such as mechanically stable plates, can be detachably attached to the outer sides of the side surfaces of the cuboid basic structure of the treatment chamber, the side surfaces being substantially formed by a permselective membrane each. Adhesive tape or mounting loops can be used for example to attach the protective elements. In addition or as an alternative, a treatment chamber can also be enclosed in a bag, e.g. made of plastic, for protection, optionally under vacuum.

The problem is also solved by a method for the electrodeionization of a sample liquid. The method according to the invention comprises the application of a voltage to an anode and cathode spatially separated by two permselective membranes, the at least partial flow of the sample liquid through a treatment chamber at least partially filled with ion exchangers, bounded by the two permselective membranes, the at least partial flow through an anode chamber located between the anode and one of the permselective membranes with the sample liquid and the at least partial flow through a cathode chamber located between the cathode and the other permselective membrane with the sample liquid.

According to the invention, the flow through the chambers can take place in different sequences. On the one hand, after the sample liquid has flowed at least partially through a treatment chamber at least partially filled with ion exchangers, which is bounded by the two permselective membranes, the sample liquid can then flow at least partially through an anode chamber located between the anode and one of the permselective membranes, and then the sample liquid can flow at least partially through a cathode chamber located between the cathode and the other permselective membrane.

On the other hand, after the sample liquid has flowed at least partially through a treatment chamber at least partially filled with ion exchangers, which is bounded by the two permselective membranes, the sample liquid can flow at least partially through a cathode chamber located between the cathode and one of the permselective membranes, and then the sample liquid can flow at least partially through an anode chamber located between the anode and the other permselective membrane.

This process substantially involves two transport mechanisms for dissolved substances. On the one hand, convection occurs, i.e. the transport of these dissolved substances with the sample liquid flow. On the other hand, electromigration takes place, i.e. the movement of electrically charged particles along an electric field. The electric field is generated by the voltage between anode and cathode. The convection corresponds to the at least partial flow through the chambers.

In an embodiment of the method according to the invention, which can be combined with any of the embodiments still to be named, unless contradictory thereto, the at least partial flow through the treatment chamber, which is at least partially filled with ion exchangers, takes place substantially in the direction of gravity, the at least partial flow through the anode chamber takes place against the direction of gravity and the at least partial flow through the cathode chamber takes place against the direction of gravity.

If gas formation occurs at the electrodes, i.e. in the anode and cathode chambers, due to electrolysis, the resulting gas can be discharged from the chamber with the sample liquid stream.

In an embodiment of the method according to the invention, which can be combined with any of the already mentioned embodiments and with any of the embodiments still to be named, unless contradictory thereto, the method further comprises the measurement of the specific conductivity of the sample liquid. The specific conductivity of the sample liquid is measured before the sample liquid at least partially flows through the treatment chamber, which is at least partially filled with ion exchangers and bounded by the two permselective membranes.

In an embodiment of the method according to the invention, which can be combined with any of the already mentioned embodiments and with any of the embodiments still to be named, unless contradictory thereto, the method further comprises the measurement of the specific conductivity of the sample liquid. The specific conductivity of the sample liquid is measured after the at least partial flow through the treatment chamber, which is at least partially filled with ion exchangers and bounded by the two permselective membranes, of the sample liquid and before the at least partial flow through the anode chamber, located between the anode and one of the permselective membranes, of the sample liquid.

In an embodiment of the method according to the invention, which can be combined with any of the already mentioned embodiments and with any of the embodiments still to be named, unless contradictory thereto, the method further comprises the degassing of at least part of the sample liquid. The specific conductivity of the sample liquid is then additionally measured before the sample liquid at least partially flows through the anode chamber located between the anode and one of the permselective membranes.

In an embodiment of the method according to the invention, which can be combined with any of the already mentioned embodiments, unless contradictory thereto, the method further comprises the integrated, continuous measurement of the flow rate of the sample liquid.

Figure 1:
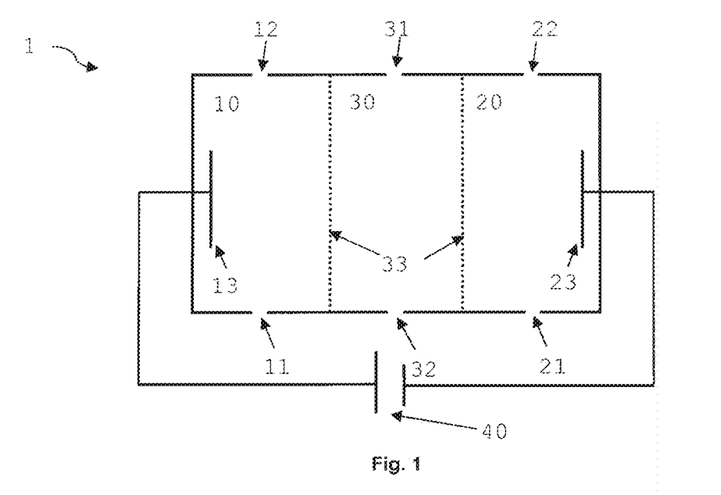
FIG. 1 shows a schematic representation of an embodiment of a device according to the invention.

Embodiment examples of the present invention are explained in more detail below by reference to the figures, wherein:

FIG. 1 shows a schematic representation of an embodiment of a device for the electrodeionization of a sample liquid.

Device 1 comprises an anode chamber 10 with an anode 13 and two openings 11, 12, a cathode chamber 20 with a cathode 23 and two openings 21, 22 and a treatment chamber 30 with two openings 31, 32. The treatment chamber 30 is located between the anode chamber 10 and the cathode chamber 20 and is filled with ion exchanger. The chambers are spatially separated from each other by permselective membranes 33. The anode 13 and the cathode 23 are operatively connected to an energy source 40. The energy source 40 provides a DC voltage applied between anode and cathode. One of the openings 31, 32 of the treatment chamber serves to supply the sample liquid to device 1, or the treatment chamber 30 respectively, whereas one of the openings 21, 22 of the cathode chamber 20 serves to discharge the sample liquid from device 1, or the cathode chamber 20 respectively. The remaining openings can be used to create an operative connection between the chambers. If, for example, opening 31 is used to admit the sample liquid, opening 32 can be used to achieve an operative connection between treatment chamber 30 and anode chamber 10, either by means of opening 11 or 12. If, for example, said operative connection has been made via opening 12, opening 11 can be connected to opening 21 or 22 to achieve an operative connection between anode chamber 10 and cathode chamber 20. For example, if openings 12 and 22 are connected to each other, opening 21 may be used to discharge the sample liquid from device 1. Alternatively, the openings can be connected to each other so that the treatment chamber is operatively connected to the cathode chamber and the cathode chamber is in turn operatively connected to the anode chamber. An opening of the treatment chamber 31, 32 then also serves to supply the sample liquid, whereas an opening of the anode chamber 11, 12 then serves to discharge the sample liquid. In the embodiment shown, all openings are located in the underside or the upper side of the chambers. It is also conceivable that the openings are arranged on one of the side walls of the chambers, for example, one opening per chamber in the lower third of the chamber and one opening per chamber in the upper third of the chamber.

Figure 2:
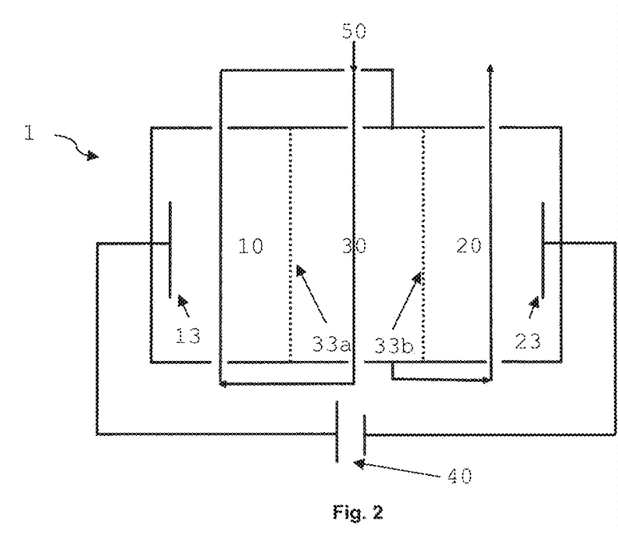
FIG. 2 shows a schematic representation of an embodiment of a device according to the invention.

FIG. 2 shows a device according to the invention as shown in FIG. 1, which is used to explain an embodiment of the method according to the invention. For the clarity of the representation, not all elements already introduced in FIG. 1 by means of reference numerals are also designated in FIG. 2, even if they are identical elements. This applies in particular to the shown openings 11, 12, 21, 22, 31 and 32.

In the illustrated device 1 shown by way of example, a DC voltage is applied between the anode 13 and the cathode 23 by means of an energy source 40. A sample liquid 50 is fed to the treatment chamber 30 via the opening 31 and flows through the treatment chamber 30, which is at least partially filled with cation exchange resin, along the openings 31 and 32 in the direction of gravity. Since the openings 32 and 11 are operatively connected, the sample liquid 50 flows into the anode chamber 10 after it has flowed through the treatment chamber 30 and flows through it along the openings 11 and 12 in the direction opposite to gravity. The sample liquid 50 then enters the cathode chamber 20 via opening 21 and flows through it along openings 22 and 21 against the direction of gravity. The sample liquid emerges from the cathode chamber 20 via opening 22.

Alternatively, the chambers could also be flowed through in the opposite direction to that described above, and the openings of the chambers could be operatively interconnected as desired, provided that it is ensured that the sample liquid first flows through the treatment chamber 30, then the anode chamber 10 and then the cathode chamber 20. The sample liquid 50 flows through the anode chamber 10 in such a way that it flows between the anode 13 and the permselective membrane 33a, which is permeable to cations and faces the anode 13. The cathode chamber 20 is flowed through by the sample liquid 50 analogous to the anode chamber 10 with respect to the cathode 23 and the membrane 33b. The sample liquid 50 flows through the treatment chamber 30 in parallel to the membranes 33a and 33b. The sample liquid crosses the electric field between the anode 13 and the cathode 23 at least partially three times. If the treatment chamber is at least partially filled with cation exchange resin and the permselective membranes are cation-permeable membranes, the described cation exchange process can be used.

In the method shown in FIG. 2, the processes described in more detail below occur:

An ion exchange of the ions dissolved in the sample liquid takes place in the treatment chamber. If the ion exchanger, as in this example, is a cation exchange resin, the anions (e.g. $Cl^-$) remain in the sample solution, but the cations (e.g. $NH_4^+$, $Na^+$) are replaced by the cations provided by the cation exchange resin (e.g. $H^+$). Within the cation exchange resin, the cations (e.g. $NH_4^+$, $Na^+$) then move along the electric field in the direction of the cathode and migrate through the permselective membrane permeable to cations and facing the cathode into the cathode chamber. The cation-exchanged sample liquid is transferred from the treatment chamber to the anode chamber. There, protons ($H^+$) are generated by electrolysis of the water in the sample liquid. These protons ($H^+$) can then migrate towards the cathode, first through the permselective cation-permeable membrane facing the anode, then through the permselective cation-permeable membrane facing the cathode. On their way, the protons ($H^+$) pass through the treatment chamber where they are available to regenerate the ion exchanger. Once the cation exchange resin has been regenerated and there are no (more) cations in the sample water in the treatment chamber, the protons migrate further into the cathode chamber. The anions and the gas (e.g. $O_2$) also formed during electrolysis in the anode chamber are transported with the sample liquid into the cathode chamber. Hydroxide ions ($OH^-$) and gas (e.g. $H_2$) are formed in the cathode chamber by electrolysis of the water. The hydroxide ions neutralize the protons ($H^+$) migrated into the cathode chamber and/or form as counterion the corresponding hydroxides (e.g. $NH_4OH$, $NaOH$) of the cations (e.g. $NH_4^+$, $Na^+$) migrated into the cathode chamber.

FIG. 3 shows a schematic representation of an embodiment of a device according to the invention for the electrodeionization of a sample liquid. The flow path of the sample liquid is also shown.

Before the sample liquid 50 enters the treatment chamber 30, it passes through a conductivity sensor 51 arranged in front of the opening 31 of the treatment chamber 30, which serves to let in the sample liquid 50, to measure the specific conductivity of the sample liquid 50. If the conductivity sensor 51 comprises a temperature sensor, the temperature-compensated specific conductivity can be determined. Another conductivity sensor 52 is located between the treatment chamber 30 and the anode chamber 10. If a temperature sensor is present, this conductivity sensor 52 can also measure the temperature-compensated specific conductivity and not just the specific conductivity.

Figure 4:
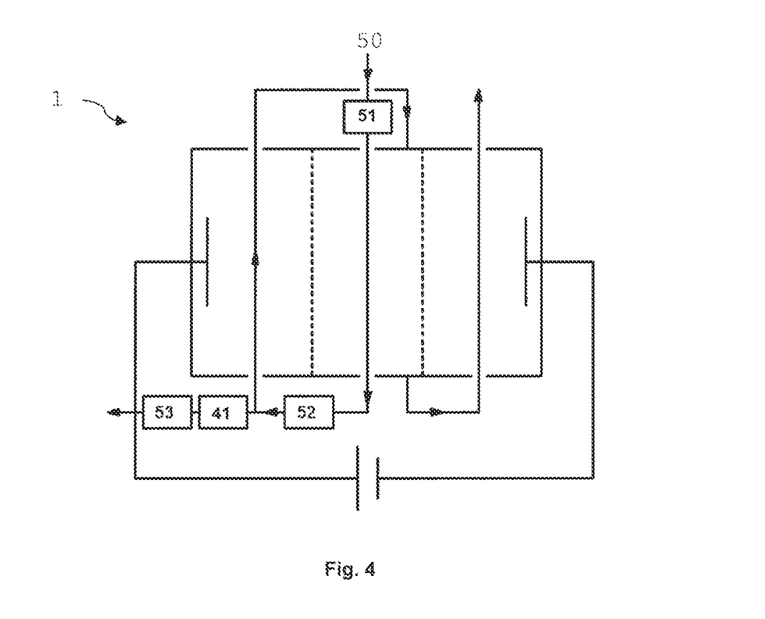
FIG. 4 shows a schematic representation of an embodiment according to FIG. 3 of a device according to the invention with three conductivity sensors.

FIG. 4 shows a schematic representation of an embodiment of a device according to the invention for the electrodeionization of a sample liquid comparable to FIG. 3.

However, the shown devices 1 differ from the device shown in FIG. 3 in that they have another conductivity sensor 53. Conductivity measurement with this conductivity sensor 53 differs from measurements with conductivity sensors 51 and 52 in that the "degassed" (temperature-compensated) specific conductivity can be determined. This means that the conductivity sensor 53 is preceded by a degassing unit 41, which degasses the sample liquid. It is completely sufficient to feed only part of the sample liquid 50 to the degassing unit and the conductivity sensor 53. This branched-off part can then simply be returned to the remaining sample liquid before entering the anode chamber 10 or fed into the anode chamber 10 via a separate further opening without prior mixing with the remaining sample liquid or can simply be discarded, i.e. disposed of. However, the entire undivided sample flow can also be conducted sequentially through the conductivity sensor 51, the degassing unit 41 and the conductivity sensor 53 and then fed into the anode chamber.

Figure 5:
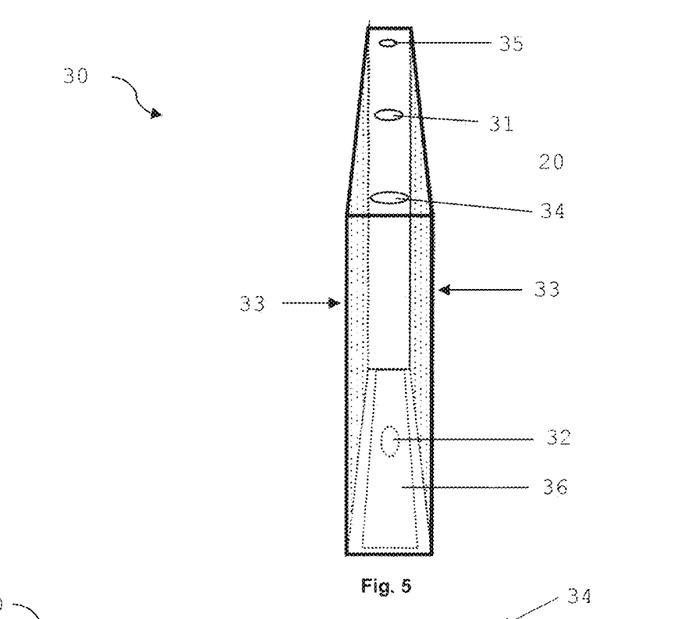
FIG. 5 shows a schematic representation of an embodiment of a treatment chamber according to the invention in a perspective view.

FIG. 5 schematically shows an embodiment of a treatment chamber according to the invention for use in a device for the electrodeionization of a sample liquid.

The illustration is a frontal view of a treatment chamber 30 with a transparent front and an upper side. The upper side comprises an opening 31, which in this example is used to let in the sample liquid 50. Furthermore, the upper side of the treatment chamber 30 comprises an opening 34 for filling in the ion exchanger and an opening 35 for degassing the sample liquid 50 located in the treatment chamber 30. In the underside there is also an opening 32. This is used to create an operative connection with the anode chamber 10 or the cathode chamber 20. The opening 32 is covered by a filter unit 36. The filter unit 36 is a filter plate made of sintered polyethylene whose pore size is only 5% to 50% of the grain size of the ion exchanger to be filled into the treatment chamber 30. The area and edge length of the filter plate 36 substantially correspond to the area and edge length of the underside of the treatment chamber 30. However, the filter plate 36 does not rest directly on the underside of the treatment chamber but is supported on support elements, in this example on interrupted support rings. All openings 31, 32, 34, 35 of the treatment chamber are designed so that they can be closed water-tight and air-tight.

Figure 6:
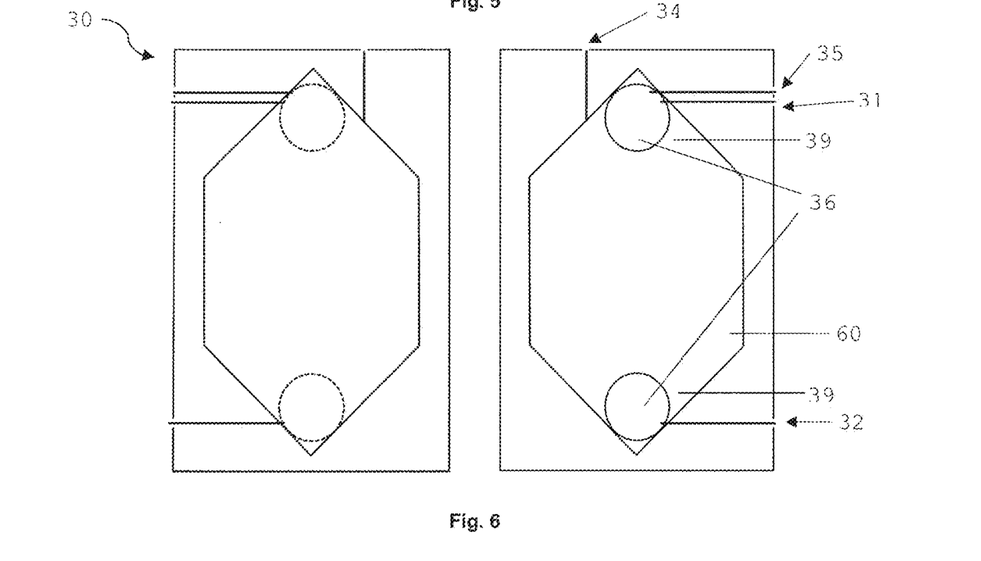
FIG. 6 shows another schematic representation of an embodiment of a treatment chamber according to the invention in a side view.

FIG. 6 schematically shows another embodiment of a treatment chamber according to the invention for use in a device for the electrodeionization of a sample liquid.

The illustration shows a view of two mutually opposite side surfaces of a treatment chamber 30. The rectangular frames can be seen, on each of which a permselective membrane 33 is adhesively applied in a gas-tight and water-tight manner. In addition, two round filters 36 are visible, which are plane-parallel to the side surfaces and are located between them, which on the one hand cover a degassing opening 35 and the opening 31 for the inlet of the sample liquid and on the other hand cover the opening 32 for the outlet of the sample liquid or for passing it on into the anode or cathode chamber. On the upper side, there is also an opening 34 for filling in the ion exchanger 60. On one side, behind each of the filters 36, there is a collection chamber 39 for the sample liquid. The supply and discharge of the sample liquid take place through a short hole in the respective collection chamber 39. The axis of these holes runs substantially within the frame parallel to the surfaces of the permselective membranes and exits on the narrow side of the frame.

Figure 7:
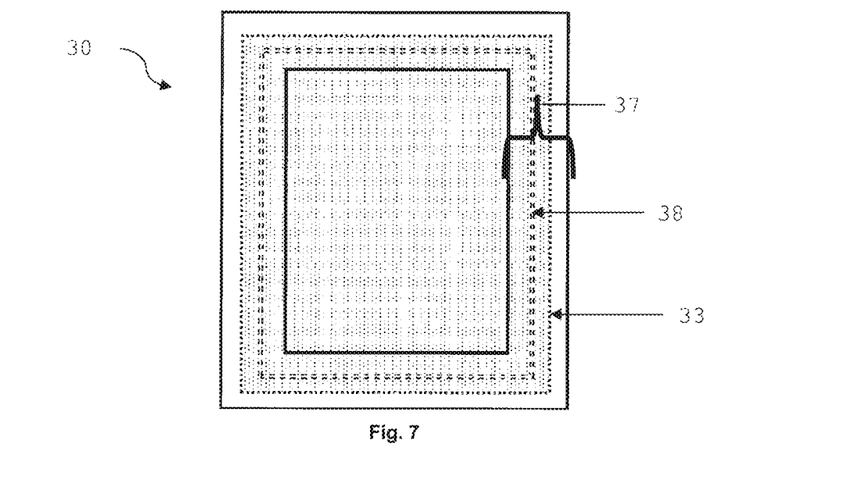
FIG. 7 shows the treatment chamber according to invention according to FIG. 5 in a side view.

FIG. 7 shows a schematic side view of an embodiment of the treatment chamber according to the invention from FIG. 5.

The side surface of the treatment chamber 30 shown comprises a plastic frame 37 with a circumferential groove 28 and a permselective membrane 33 adhesively applied to this frame 37. If the membrane 33 is attached to the frame 37 by means of an adhesive, excess adhesive can flow into the groove 38 and does not swell out along the side edges of the membrane 33. The membrane 33 can also be attached to the frame 37 by means of ultrasonic welding.

Alternatively, a side surface of a treatment chamber 30 can also consist of two congruently arranged frames 37, between which a permselective membrane 33 is attached, for example by gluing or clamping. The frame 37 and the membrane 33 can also be connected by laminating.

Figure 8:
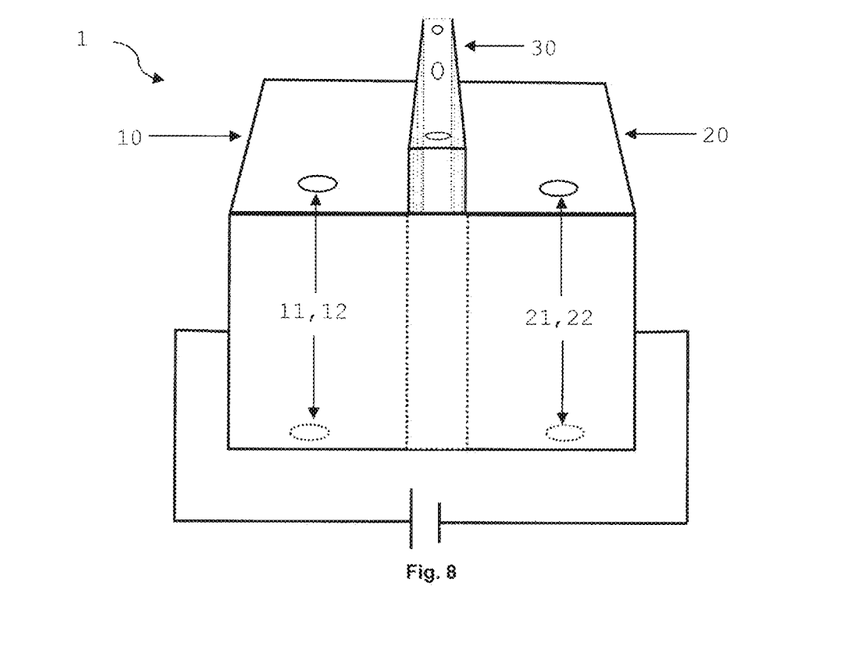
FIG. 8 shows a schematic representation of an embodiment of a device according to the invention with an exchangeable treatment chamber in a perspective view.

FIG. 8 schematically shows an embodiment of a device according to the invention for the electrodeionization of a sample liquid according to the invention, which comprises a treatment chamber comparable to the one shown in FIG. 5.

The device comprises an anode chamber 10, a cathode chamber 20 and an exchangeable treatment chamber 30, which is inserted with a precise fit into a space between anode and cathode and thus causes the actual spatial subdivision of the device 1 into three chambers by its side surfaces comprising the permselective membranes 33.

In particular, a snapshot of the insertion of the treatment chamber 30 is shown. The straight, dashed lines indicate where the treatment chamber 30 will be located after correct placement, between anode 13 and cathode 23, and is fixed by means of quick-release fasteners.

In this example, the anode chamber 10 and cathode chamber 20 are integrally connected by a common underside. On this underside, for example, two parallel rails can be attached, which can serve as guide elements for the side surfaces of the treatment chamber 30 provided with the permselective membranes 33.

Similarly, those embodiments and examples, which are intended for cation exchange, can also be modified within the framework of the invention in such a way that they can be used for anion exchange. If, for example, an anion exchange were desired as a form of electrodeionization, the opening of the treatment chamber not intended for the inlet of the sample liquid would be connected to one opening of the cathode chamber, the other opening of the cathode chamber would be connected to one of the openings of the anode chamber, and the other opening of the anode chamber not connected to the cathode chamber would, in turn, serve as an outlet opening for the sample liquid.

For example, a conductivity sensor and optionally another conductivity sensor with a degassing unit arranged in front of it would be arranged between the treatment chamber and the cathode chamber.

In addition, anion exchangers could be used instead of cation exchangers in the treatment chamber. The permselective membranes, which limit the treatment chamber, would be permeable for anions instead of cations.

Further analogous modifications within the scope of the invention can be easily recognized by the person skilled in the art.

The invention claimed is:

1. A device (1) for electrodeionization of a sample liquid 50 for a specific conductivity measurement to detect a penetration of cooling water into process water, comprising:
   an anode chamber (10) comprising two openings (11, 12) and an anode (13);
   a cathode chamber (20) comprising two openings (21, 22) and a cathode (23);
   a treatment chamber (30) located between the anode chamber (10) and the cathode chamber (20) comprising two openings (31, 32) and an ion exchanger, wherein the anode chamber (10) and the cathode chamber (20) are separated from the treatment chamber (30) by respective anion-permeable permselective membranes (33:33a, 33b); and
   an energy source (40) operatively connected to the anode (13) and the cathode (23);
   wherein
   one of the openings (31; 32) of the treatment chamber (30), the openings (21, 22) of the cathode chamber (20) and one of the openings (11; 12) of the anode chamber (10) are connected to each other such that the treatment chamber (30) is operatively connected to the cathode chamber (20) and the cathode chamber (20) is operatively connected to the anode chamber (10),
   wherein the one opening (31; 32) of the treatment chamber (30), the openings (21, 22) of the cathode chamber (20) and the one opening (11; 12) of the anode chamber (10) are connected to each other in such a way that the supplied sample liquid 50 in the treatment chamber (30) is guided substantially in the direction of gravity and is guided in the anode chamber (10) and the cathode chamber (20) substantially against the direction of gravity;
   wherein the supplied sample liquid is guided substantially in the direction of gravity from the cathode chamber (20) to the anode chamber (10); and
   wherein the opening of the treatment chamber that is not connected to the cathode chamber is an inlet opening for the sample liquid 50 and the opening of the anode chamber that is not connected to the cathode chamber is an outlet for the sample liquid, and the two respective openings of the anode chamber, the cathode chamber, and the treatment chamber are arranged spaced apart from each other with one of the two respective openings in an upper third of the respective chamber and the other of the two respective openings in a lower third of the respective chamber in order to facilitate the guiding of the supplied sample liquid 50 substantially in the direction of gravity in the treatment chamber and substantially against the direction of gravity in the anode chamber and the cathode chamber.

2. Device (1) according to claim 1, wherein a conductivity sensor (51) is arranged in front of the unconnected openings (31; 32) of the treatment chamber (30).

3. Device (1) according to claim 2, wherein at least one of the conductivity sensors (51; 52; 53) comprises a temperature sensor.

4. Device (1) according to claim 2, comprising an electronic measuring system, which records and processes at least one of the following:
   signal from at least one of the conductivity sensors;
   signal from at least one of the temperature sensors;
   signal from at least one of the flow sensors;
   signal from at least the optical sensor;
   a voltage of the power source (40);
   a current of the power source (40).

5. Device (1) according to claim 1, comprising at least one flow sensor arranged in front of at least one of the following:
   one of the openings (31; 32) of the treatment chamber (30);
   one of the openings (11; 12) of the anode chamber (10);
   one of the openings (21; 22) of the cathode chamber (20).

6. Device (1) according to claim 1, wherein the ion exchanger is a color-indicating ion exchanger.

7. Device (1) according to claim 1, wherein the treatment chamber (30) is formed at least partially transparent.

8. Device (1) according to claim 7, comprising an optical sensor for monitoring the ion exchanger.

9. Device (1) according to claim 1, wherein at least one of the openings (31, 32) of the treatment chamber (30) comprises a filter unit.

10. Device (1) according to claim 1, comprising at least one ion-conducting membrane, arranged in at least one of the following:
    anode chamber (10) between the anode (13) and the permselective membrane (33) facing the anode (13);
    cathode chamber (20) between the cathode (23) and the permselective membrane (33) facing the cathode (23).

11. Device (1) according to claim 1, wherein the treatment chamber (30) is exchangeable.

12. Device (1) according to claim 1, wherein a conductivity sensor (52) is arranged between the treatment chamber (30) and the cathode chamber (20).

13. Device (1) according to claim 1, wherein a conductivity sensor (52) is arranged between the treatment chamber (30) and the anode chamber (10).

14. Device (1) according to claim 13, comprising a degassing unit (41) arranged after the conductivity sensor (52), wherein a further conductivity sensor (53) is arranged after the degassing unit (41).

15. Device (1) according to claim 1, wherein the treatment chamber is at least partially filled with anion exchange resin.

16. Device (1) according to claim 1, wherein the ion exchanger is an anion exchange resin.

17. A device (1) for electrodeionization of a sample liquid 50 for a specific conductivity measurement to detect a penetration of cooling water into process water, comprising:

an anode chamber (10) comprising two openings (11, 12) and an anode (13);

a cathode chamber (20) comprising two openings (21, 22) and a cathode (23);

a treatment chamber (30) located between the anode chamber (10) and the cathode chamber (20) comprising two openings (31, 32) and an ion exchanger, wherein the anode chamber (10) and the cathode chamber (20) are separated from the treatment chamber (30) by respective cation-permeable permselective membranes (33:33a, 33b); and an energy source (40) operatively connected to the anode (13) and the cathode (23);

wherein
   one of the openings (31; 32) of the treatment chamber (30), the openings (11, 12) of the anode chamber (10) and one of the openings (21; 22) of the cathode chamber (20) are connected to each other such that the treatment chamber (30) is operatively connected to the anode chamber (10) and the anode chamber (10) is operatively connected to the cathode chamber (20), wherein the one opening (31; 32) of the treatment chamber (30), the openings (11, 12) of the anode chamber (10) and the one opening (21; 22) of the cathode chamber (20) are connected to each other in such a way that the supplied sample liquid 50 in the treatment chamber (30) is guided substantially in the direction of gravity and is guided in the anode chamber (10) and the cathode chamber (20) substantially against the direction of gravity;

wherein the supplied sample liquid is guided substantially in the direction of gravity from the anode chamber (10) to the cathode chamber (20); and wherein the opening of the treatment chamber that is not connected to the anode chamber is an inlet opening for the sample liquid 50 and the opening of the cathode chamber that is not connected to the anode chamber is an outlet for the sample liquid, and the two respective openings of the anode chamber, the cathode chamber, and the treatment chamber are arranged spaced apart from each other with one of the two respective openings in an upper third of the respective chamber and the other of the two respective openings in a lower third of the respective chamber in order to facilitate the guiding of the supplied sample liquid 50 substantially in the direction of gravity in the treatment chamber and substantially against the direction of gravity in the anode chamber and the cathode chamber.

18. Device (1) according to claim 17, wherein a conductivity sensor (52) is arranged between the treatment chamber (30) and the anode chamber (10).

19. Device (1) according to claim 18, comprising a degassing unit (41) arranged after the conductivity sensor (52), wherein a further conductivity sensor (53) is arranged after the degassing unit (41).

20. Device (1) according to claim 17, wherein the ion exchanger is a cation exchange resin.

21. Device (1) according to claim 17, wherein the treatment chamber is at least partially filled with cation exchange resin.

22. Device (1) according to claim 17, wherein a conductivity sensor (51) is arranged in front of the unconnected openings (31; 32) of the treatment chamber (30).

23. Device (1) according to claim 22, wherein at least one of the conductivity sensors (51; 52; 53) comprises a temperature sensor.

24. Device (1) according to claim 22, comprising an electronic measuring system, which records and processes at least one of the following:
    a signal from at least one of the conductivity sensors;
    a signal from at least one of the temperature sensors;
    a signal from at least one of the flow sensors;
    a signal from at least the optical sensor;
    a voltage of the power source (40); and
    a current of the power source (40).

25. Device (1) according to claim 17, comprising at least one flow sensor arranged in front of at least one of the following:
    one of the openings (31; 32) of the treatment chamber (30);
    one of the openings (11; 12) of the anode chamber (10); and
    one of the openings (21; 22) of the cathode chamber (20).

26. Device (1) according to claim 17, wherein the ion exchanger is a color-indicating ion exchanger.

27. Device (1) according to claim 17, wherein the treatment chamber (30) is formed at least partially transparent.

28. Device (1) according to claim 27, comprising an optical sensor for monitoring the ion exchanger.

29. Device (1) according to claim 17, wherein at least one of the openings (31, 32) of the treatment chamber (30) comprises a filter unit.

30. Device (1) according to claim 17, comprising at least one ion-conducting membrane, arranged in at least one of the following:
    the anode chamber (10) between the anode (13) and the permselective membrane (33) facing the anode (13);
    the cathode chamber (20) between the cathode (23) and the permselective membrane (33) facing the cathode (23).

31. Device (1) according to claim 17, wherein the treatment chamber (30) is exchangeable.

* * * * *